(12) United States Patent
Pandey et al.

(10) Patent No.: US 11,667,654 B2
(45) Date of Patent: Jun. 6, 2023

(54) PROCESS FOR THE PREPARATION OF BORONIC ACID ESTERS

(71) Applicant: FRESENIUS KABI ONCOLOGY LIMITED, New Delhi (IN)

(72) Inventors: Maneesh Kumar Pandey, Haryana Gurgaon (IN); Raj Narayan Tiwari, Haryana Gurgaon (IN); Sonu Shukla, Haryana Gurgaon (IN); Sarbjot Singh Sokhi, Haryana Gurgaon (IN); Govind Singh, Haryana Gurgaon (IN); Saswata Lahiri, Haryana Gurgaon (IN); Walter Cabri, Cassina de' Pecchi (IT)

(73) Assignee: Fresenius Kabi Oncology Ltd., New Delhi (IN)

( * ) Notice: Subject to any disclaimer, the term of this patent is extended or adjusted under 35 U.S.C. 154(b) by 19 days.

(21) Appl. No.: 16/484,346

(22) PCT Filed: Feb. 19, 2018

(86) PCT No.: PCT/IB2018/050999
§ 371 (c)(1),
(2) Date: Aug. 7, 2019

(87) PCT Pub. No.: WO2018/150386
PCT Pub. Date: Aug. 23, 2018

(65) Prior Publication Data
US 2020/0031850 A1 Jan. 30, 2020

(30) Foreign Application Priority Data
Feb. 17, 2017 (IN) .............................. 201711005668

(51) Int. Cl.
*C07F 5/02* (2006.01)

(52) U.S. Cl.
CPC .......... *C07F 5/025* (2013.01); *C07B 2200/07* (2013.01)

(58) Field of Classification Search
CPC .............................. C07F 5/025; C07D 241/18
See application file for complete search history.

(56) References Cited

U.S. PATENT DOCUMENTS

| | | | |
|---|---|---|---|
| 2010/0226597 A1 | 9/2010 | Palle et al. | |
| 2013/0085277 A1 | 4/2013 | Kumar et al. | |

FOREIGN PATENT DOCUMENTS

| | | |
|---|---|---|
| CN | 103204867 A | 7/2013 |
| CN | 103374026 A | 10/2013 |
| CN | 103539832 A | 1/2014 |
| CN | 103897028 A | 7/2014 |
| CN | 103012551 B | 11/2014 |
| CN | 101899062 B | 4/2015 |
| CN | 103497233 B | 4/2015 |
| CN | 105601705 A | 5/2016 |
| IN | 1761/MUM/2009 | 10/2011 |
| IN | 972/MUM/2013 | 5/2015 |
| IN | 291709 | 1/2018 |
| WO | WO 96/013266 A1 | 5/1996 |
| WO | WO 2005/097809 A2 | 10/2005 |
| WO | WO 2008/075376 A1 | 6/2008 |
| WO | WO 2009/004350 A1 | 1/2009 |
| WO | WO 2009/036281 A2 | 3/2009 |
| WO | WO 2011/087822 A1 | 7/2011 |
| WO | WO 2011/099018 A1 | 8/2011 |
| WO | WO 2011/107912 A1 | 9/2011 |
| WO | WO 2012/048745 A1 | 4/2012 |
| WO | WO 2012/131707 A2 | 10/2012 |
| WO | WO 2014/041324 A1 | 3/2014 |

(Continued)

OTHER PUBLICATIONS

Coutts, Two Efficient Methods for the Cleavage of Pinanediol Boronate Esters Yielding the Free Boronic Acids, 1994, Tetrahedron Letters, vol. 35, No. 29, p. 5109-5112 (Year: 1994).*
Byrne, Tools and techniques for solvent selection: green solvent selection guides, Sustainable Chemical Processes, 2016, vol. 4, No. 7, p. 1-24 (Year: 2016).*
Greene, Greene's Protective Groups in Organic Synthesis, 4th Ed, 2007, John Wiley & Sons, p. 643-645 (Year: 2007).*
Balbach et al., "Pharmaceutical evaluation of early development candidates: 'The 100 mg approach'," *International Journal of Pharmaceutics* 275: 1-12 (2004).
Caira, "Crystalline Polymorphism of Organic Compounds," *Topics in Current Chemistry*, vol. 198, pp. 163-208, Springer, Berlin, Germany (1998).
*Polymorphism in Pharmaceutical Solids.* H.G. Brittain, editor, Marcel Dekker Inc, New York, pp. 235-238 (1999).

(Continued)

*Primary Examiner* — Sun Jae Yoo
(74) *Attorney, Agent, or Firm* — Leydig, Voit & Mayer, Ltd.

(57) ABSTRACT

The present invention relates to an improved process for the preparation of a compound of formula (I), wherein $PG_1$ may be independently selected from tert-butyloxycarbonyl (Boc), phthaloyl, 9-fluorenylmethyloxycarbonyl (Fmoc), triphenylmethyl (Trityl), carboxybenzyl (Cbz), trifluoroacetyl, benzyl (Bn), benzylidene, methanesulfonyl (Mesyl), toluene sulfonyl (Tosyl) or acyl; its isolation as solid and use for the preparation of the compound of formula (IV), in particular the compound of formula (IV) i.e. [(1R)-3-methyl-1[[(2S)-1-oxo-3-phenyl-2-[(pyrazinylcarbonyl) amino]propyl] amino]butyl] boronic acid with more than 99.95% chiral purity, as measured by HPLC.

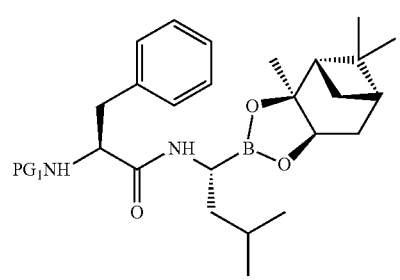

Formula I

18 Claims, 1 Drawing Sheet

(56) References Cited

FOREIGN PATENT DOCUMENTS

WO     WO 2014/076713 A2     5/2014
WO     WO 2015/122702 A1     8/2015

OTHER PUBLICATIONS

Singhal et al., "Drug Polymorphism and Dosage Form Design: A practical perspective," *Advanced Drug Delivery Reviews* 56: 335-347 (2004).

IP Australia, Examination Report No. 1 in Australian Patent Application No. 2018221670 (dated Mar. 12, 2020).

Greene et al., "Protective Groups in Organic Synthesis," 3rd Ed., pp. 17-245, J. Wiley & Sons (1999).

Chen et al., "Synthesis of Antitumor Drug Bortezomib," *Huaxue Yu Shengwu Gongcheng* 31(6): 42-44 (2014).

European Patent Office, International Search Report in International Application No. PCT/IB2018/050999 (dated May 25, 2018).

European Patent Office, Written Opinion in International Application No. PCT/IB2018/050999 (dated May 25, 2018).

International Bureau of WIPO, International Preliminary Report on Patentability in International Application No. PCT/IB2018/050999 (dated Aug. 20, 2019).

Kinder et al., "Synthesis of 2-Amino-3-boronopropionic Acid: A Boron-Containing Analogue of Aspartic Acid," *J. Org. Chem* 52: 2452-2454 (1987).

Matteson et al., "Directed Chiral Synthesis with Pinanediol Boronic Esters," *J. Am. Chem. Soc. 102*: 7590-7591 (1980).

Song et al., "Cedranediolborane as a Borylating Agent for the Preparation of Boronic Acids: Synthesis of a Boronated Nucleoside Analogue," *Synlett 2*: 266-268 (2001).

\* cited by examiner

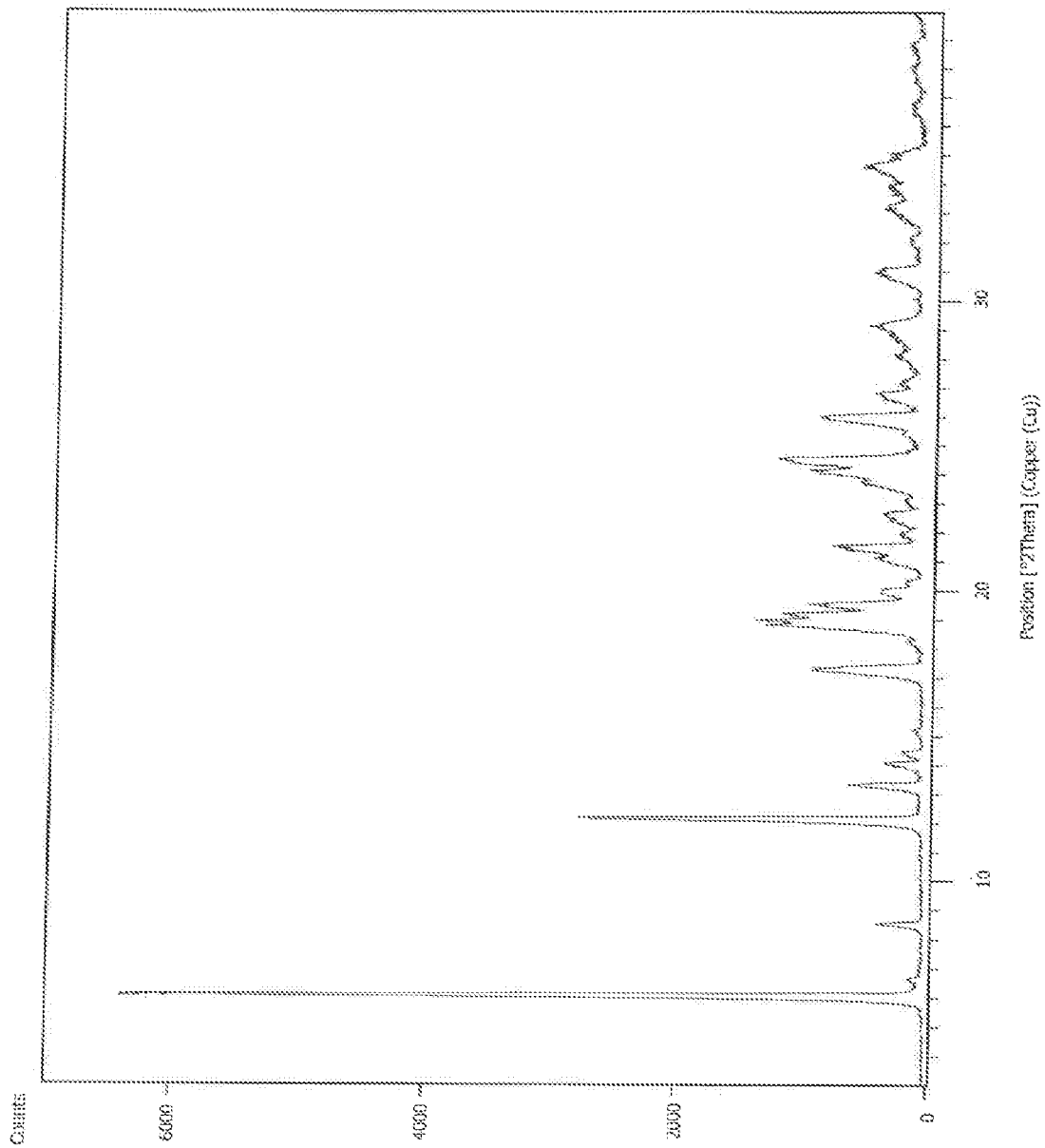

PROCESS FOR THE PREPARATION OF BORONIC ACID ESTERS

CROSS-REFERENCE TO RELATED APPLICATIONS

This patent application is the U.S. national stage of International Patent Application No. PCT/IB2018/050999, filed on Feb. 19, 2018, which claims the benefit of Indian Patent Application No. 201711005668, filed Feb. 17, 2017, the disclosures of which are incorporated herein by reference in their entireties for all purposes.

FIELD OF THE INVENTION

The present invention relates to an improved process for the preparation of the compound of formula I, used in the synthesis of bortezomib.

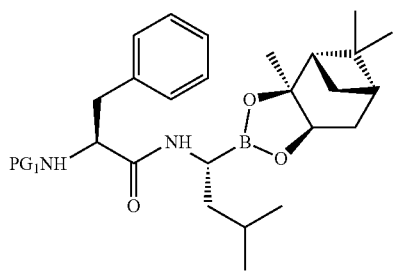

Formula I wherein $PG_1$ may be independently selected from tert-butyloxycarbonyl (Boc), phthaloyl, 9-fluorenylmethyloxycarbonyl (Fmoc), triphenylmethyl (Trityl), carboxybenzyl (Cbz), trifluoroacetyl, benzyl (Bn), benzylidene, methanesulfonyl (Mesyl), toluene sulfonyl (Tosyl) or acyl.

The present invention also relates to an improved process for the conversion of the compound of formula I to a compound of formula III.

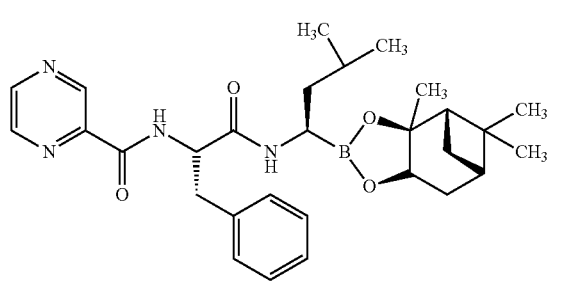

Formula III

The present invention further relates to an improved process for the synthesis of bortezomib from the compound of either formula I or III.

The present invention further relates to a process for the preparation of a crystalline form of bortezomib characterized by an X-ray powder diffractogram having peaks at 6.11, 12.18, 17.25, 18.98, 19.22, 24.55, 24.39±0.2 degrees 2θ: Crystalline form of bortezomib of the present invention is further characterized by its X-ray powder diffractogram as depicted in the figure.

BACKGROUND OF THE INVENTION

Bortezomib, [(1R)-3-methyl-1-[[(2S)-1-oxo-3-phenyl-2-[(Pyrazinylcarbonyl) amino]propyl]-amino] butyl] boronic acid is represented by the formula IV,

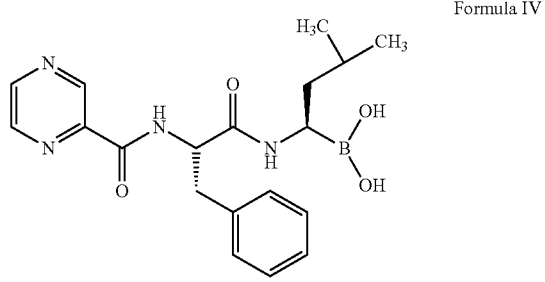

Formula IV

Bortezomib (marketed under the trade name Velcade, Millennium Pharmaceuticals) is a reversible inhibitor of the chymotrypsin-like activity of the 26S proteasome in mammalian cells. It is indicated for the treatment of patients with multiple myeloma and mantle cell lymphoma.

Bortezomib, as represented by formula IV is disclosed in WO 96/013266. Various processes for the preparation of bortezomib have been described in literature. WO2005/097809 describes a large scale process for the preparation of bortezomib as depicted in scheme-1:

Scheme-1

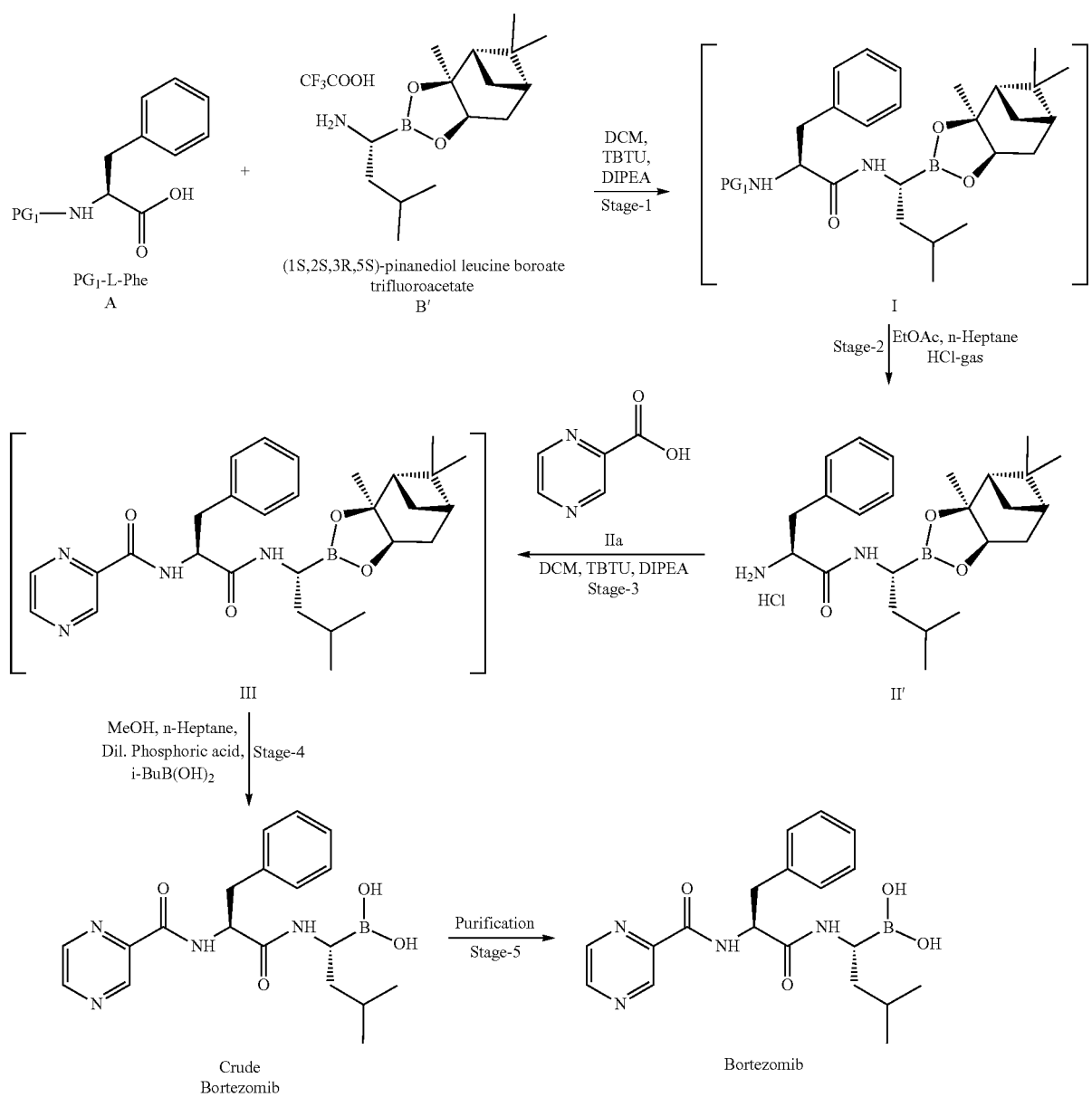

wherein, PG$_1$ means tert-butoxycarbonyl; DCM means Dichloromethane; EtOAc means Ethyl acetate; DIPEA means diisopropyl ethyl amine; TBTU means O-(benzotriazol-1-yl)-N,N,N',N'-tetramethyl uronium tetrafluoroborate.

In stage-1, the coupling of (1S,2S,3R,5S)-pinanediol leucine boroate trifluoroacetate with protected L-phenylalanine is carried out in the presence of 2-(1H-benzotriazol-1-yl)-1,1,3,3-tetramethyluronium tetrafluoroborate (TBTU), tertiary amine in dichloromethane as a solvent. Thereafter, solvent exchange is performed to replace dichloromethane with ethyl acetate.

In the work-up procedure of stage-1, the ethyl acetate solution requires washings with brine and phosphoric acid solution. Subsequently, the ethyl acetate solution is concentrated under vacuum before proceeding with the reaction.

The compound is obtained as an oily mass and the reaction is advanced without any purification. Purity of the compound is not mentioned.

In stage-2 hydrogen chloride gas is purged to the oily mass to obtain the compound of formula II'. Reaction yield is ca. 79%. Purity is not specified.

In stage-3, the compound of formula II' is reacted with pyrazine-2-carboxylic acid in the presence of 2-(1H-benzotriazol-1-yl)-1,1,3,3-tetramethyluronium tetrafluoroborate (TBTU) and tertiary amine in dichloromethane as a solvent. Again, a long and cumbersome work-up procedure where solvent exchange of dichloromethane with ethyl acetate is performed followed by washings with brine and phosphoric acid solution similar to the procedure followed in stage-1 to obtain the compound of formula III as a concentrated mass. Additionally replacement of ethyl acetate with a hydrocarbon solvent is performed in a second solvent exchange step.

Subsequently, the compound of formula III in the hydrocarbon solution is subjected to deprotection of the boronic acid moiety in a biphasic mixture (stage-4).

In stage-4, deprotection of boronic acid moiety is performed in a biphasic mixture of a lower alkanol and a $C_{5-8}$ hydrocarbon to obtain crude bortezomib. Crude bortezomib is isolated by performing 15-20 work-up steps. Reaction yield is ca. 83% (purity-99.24%).

A similar process for the synthesis of bortezomib is described in WO14/041324. This process avoids solvent exchange exercise at stage-1 and stage-3 of scheme-1, but the process involves halogenated solvents in the reaction process. Also, a tedious work-up procedure such as quenching with HCl solution, filtration through hyflo bed (filter aid) and multiple washings are required in the process. Again, the obtained compound in the halogenated solvent without isolation was advanced to next reaction step. In the next stage, deprotection of the amine protecting group is performed in the presence of an alcoholic solution of an inorganic acid. The overall reaction yield is ca. 66.45%. Further, de-protection of the compound of formula III in stage-4 is performed in a biphasic solvent system which again involves alcohols such as methanol, ethanol, n-propanol, isopropanol, n-butanol and isobutanol as co-solvent similar to the process described in WO 05/097809.

It was found that in the above processes the purity of the intermediate compounds is low which requires multiple purification steps, consequently leading to significant yield loss.

Generally, impurities in an active pharmaceutical ingredient (API) may arise from degradation of the API itself, or may be a process generated impurity. The inventors of the present invention have found that in the present case, deboronated and dimer impurities are formed at stage-1 (scheme-1). The structures of these impurities are as shown below:

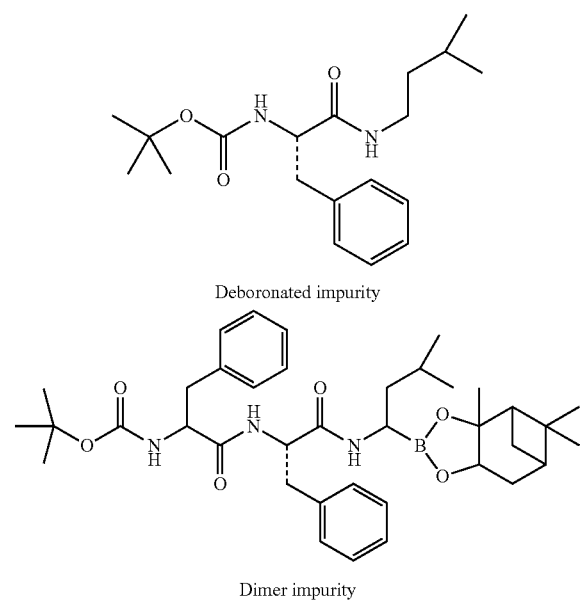

Deboronated impurity

Dimer impurity

A possible reason for the generation of the deboronated impurity appears to be disintegration of the pinanediol boron moiety of the compound of formula I, while the dimer impurity is formed due to instability of the compound of formula A.

Such deboronated and dimer impurities will give side reactions which may lead to further impurities in the subsequent steps. These impurities are difficult to remove and result in low yield and purity in the subsequent steps as well.

Additionally, it was found that the deprotection of the boronic acid moiety in a biphasic mixture at stage-4 of scheme-1 results in another impurity, as shown below:

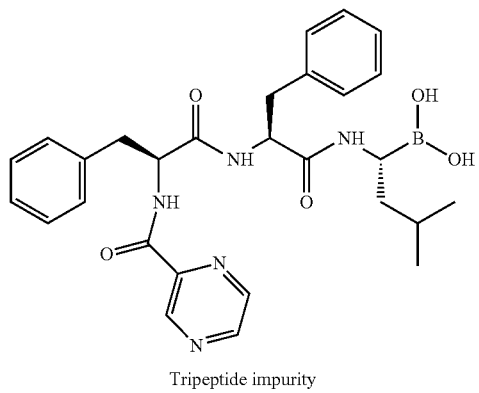 [SMILES: CC(C)C[C@H](NC(=O)[C@H](Cc1ccccc1)NC(=O)[C@H](Cc1ccccc1)NC(=O)c1cnccn1)B(O)O]

Tripeptide impurity

It appears that the tripeptide impurity is a process generated impurity formed due to the side reaction of the dimer impurity with compound of formula IIa.

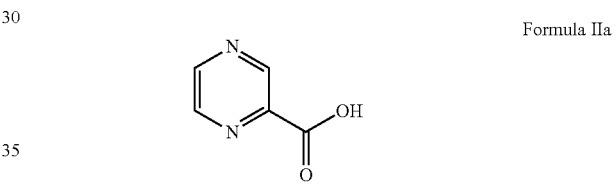

Formula IIa

This consequently, reduces the overall yield of the reaction, and complex purification steps are required to remove such impurities.

In Chinese application no. CN 2012/1539954, a process for the deprotection of the boronic acid moiety in a solvent such as tertahydrofuran is disclosed. This process avoids a biphasic solvent system.

The inventors of the present invention found that the deprotection of the boronic acid moiety by following the process as described in CN 2012/1539954 results in a sticky solid compound with low purity, ca. 93% (see reference example in the experimental section for the experimental procedure).

It was also difficult to isolate the compound so obtained from the reaction mixture due to its sticky nature.

There are other patent applications such as WO 2012/048745, IN1761/MUM/2009, WO 2011/087822, WO 09/004350 and CN 2012/1539954 which disclose various processes of bortezomib synthesis by following different routes of synthesis.

WO 2012/048745 describes the preparation of bortezomib and its intermediates using cyclic alkyltriphosphonate anhydride as a coupling agent.

Further, Indian patent application IN1761/MUM/2009 describes a one pot process for the preparation of bortezomib using an activated ester of pyrazine-2-carboxylic acid.

In WO 11/087822, the authors describe a process for the preparation of bortezomib by using an intermediate of formula as shown below:

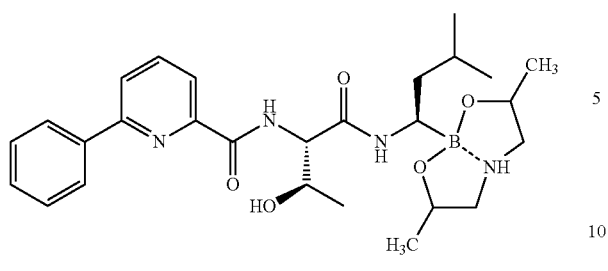

Similarly, WO 09/004350 describes a process for the preparation of bortezomib using intermediates as shown below:

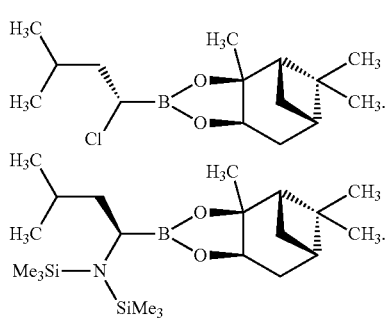

From the forgoing, it is apparent that the reported methods for the preparation of bortezomib require stringent operational conditions which are not only tedious but also result in significant yield loss. The processes require the use of halogenated solvents at several stages including tedious solvent exchange exercises or a biphasic solvent system. Moreover, long work-up procedures at several stages and/or preparation of typical intermediates make the process unsuitable for commercial scale.

Thus, there remains the need to formulate an efficient, simple and industrially viable synthetic process which can overcome the drawbacks of the prior art and which provides bortezomib and its intermediates free of impurities.

OBJECT OF THE INVENTION

It is an object of the present invention to overcome the above-mentioned drawbacks of the prior art.

It is another objective of the present invention to avoid tedious and long work-up procedures for the synthesis of bortezomib.

It is another objective to provide a process for the production of a crystalline form of bortezomib.

It is a further objective of the present invention to provide an improved and commercially viable process for the synthesis of bortezomib.

SUMMARY OF THE INVENTION

In a first aspect, the present invention relates to an improved process for the preparation of the compound of formula IV,

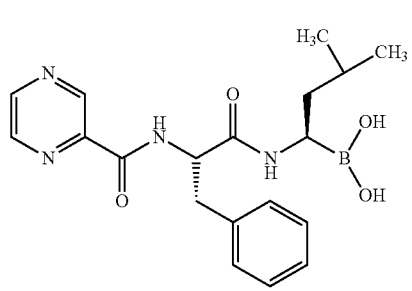

Formula IV comprising the reaction of a compound of formula A,

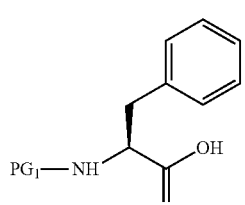

Formula A wherein $PG_1$ may be independently selected from tert-butyloxycarbonyl (Boc), phthaloyl, 9-fluorenylmethyloxy-carbonyl (Fmoc), triphenylmethyl (Trityl), carboxybenzyl (Cbz), trifluoroacetyl, benzyl (Bn), benzylidene, methanesulfonyl (Mesyl), toluene sulfonyl (Tosyl) or acyl;

with a compound of formula B or an acid addition salt thereof,

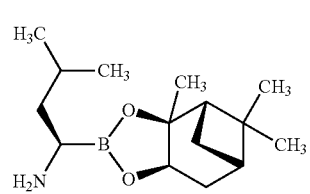

Formula B in the presence of a coupling agent and a base in a nitrile solvent, to obtain a compound of formula I,

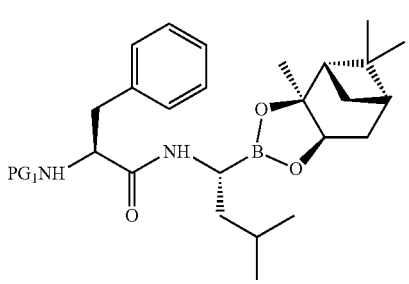

Formula I isolating the compound of formula I, and converting to the compound of formula IV.

Another aspect of the present invention is to provide a process for the preparation of compound of formula IV,

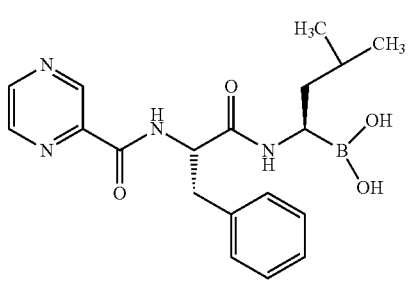

Formula IV comprising the de-protection of the boronic acid moiety of formula III,

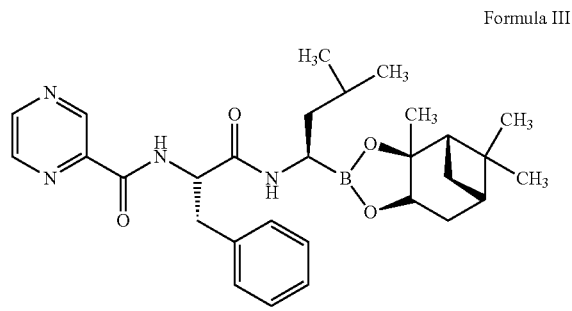

Formula III in a monophasic solvent system, wherein the solvent is selected from diethyl ether, di-isopropyl ether, methyl-t-butyl ether, preferably di-isopropyl ether.

In another aspect, the present invention provides a process for the preparation of a crystalline form of formula IV, comprising the steps of:
  i) dissolving the compound of formula IV in an aliphatic ester,
  ii) adding an aliphatic ether, and
  iii) isolating a crystalline form of formula IV, having characteristic X-ray powder diffraction peaks at 6.11, 12.18, 17.25, 18.98, 19.22, 24.55, 24.39+0.2 degrees 2:

BRIEF DESCRIPTION OF THE FIGURE

The figure represents an X-ray powder diffractogram of the crystalline form bortezomib of the present invention.

DETAILED DESCRIPTION OF THE INVENTION

Definitions

The following definitions are used in connection with the present application unless the context indicates otherwise.

The term "coupling agent" as used herein refers to a chemical reagent that couples together the carboxylic acid functionality of a compound with the amine functionality of a compound to form an amide (—CONH) linkage. Those skilled in the art will be familiar with the selection of the coupling agents and will appreciate that many different coupling agents are known in the art, the suitability of one coupling agent or another being dependent on the particular synthetic scheme planned.

The term 'halogenated solvent_ referred herein are organic solvents such as dichloromethane, dichloroethane, dibromomethane, dibromoethane, trichloromethane, tribromomethane, tetrachloromethane and the like.

The term 'salt_ of a compound relates to corresponding salt prepared by using acid selected from the group comprising of mineral acids, such as hydrochloric acid, hydrobromic acid, phosphoric acid, metaphosphoric acid, nitric acid and sulphuric acid, and organic acids, such as tartaric acid, acetic acid, trifluoroacetic acid, citric acid, malic acid, lactic acid, fumaric acid, benzoic acid, glycolic acid, gluconic acid, succinic acid and alkylsulphonic acids such as methanesulphonic, ethanesulphonic acids, ethane-1,2-disulfonic acid and 2-hydroxyethanesulfonic acid and arylsulphonic acids such as benzene sulfonic acid, 2-naphthalenesulfonic acid, p-toluenesulphonic acid and naphthalene-1,5-disulfonic acid.

The salt of a compound can be prepared according to a general standard method for the preparation of a salt known in the art.

The term 'monophasic solvent system_ used herein, refers to a solvent system in which only a single solvent is used during the reaction.

The term 'boronic acid acceptor_ as used herein refers to a reagent that facilitates the cleavage of the ester linkage of boronic acid moiety and releases the pinanediol. Those skilled in the art will be familiar with the selection of the boronic acid acceptors and will appreciate that many different boronic acid acceptors such as isobutylboronicacid, isopropylboronicacid, 2-methyl-1-propylboronicacid are known in the art, the suitability of boronic acid acceptor or another being dependent on the particular synthetic scheme planned.

The term 'compound of formula I free of deboronated and dimer impurities_ refers to a compound of formula I wherein such impurities are not detected as measured by HPLC.

The term 'compound of formula I substantially free of deboronated and dimer impurities_ refers to compound of formula I containing the deboronated impurity in less than 0.15 area % as measured by HPLC and the dimer impurity is not detected as measured by HPLC. More preferably, the compound of formula I, as disclosed herein, contains deboronated impurity in less than 0.10 area % as measured by HPLC and most preferably contains the deboronated impurity in less than 0.05 area % as measured by HPLC, while the dimer impurity is not detected as measured by HPLC.

As used herein, the terms 'comprising_ and 'comprises_ mean the elements recited, or their equivalents in structure or function, plus any other element or elements which are not recited and the terms 'comprising the steps of_ include the steps recited, or the equivalent steps irrespective of the sequence in which they are recited.

In one aspect, a process for the preparation of the compound of formula IV,

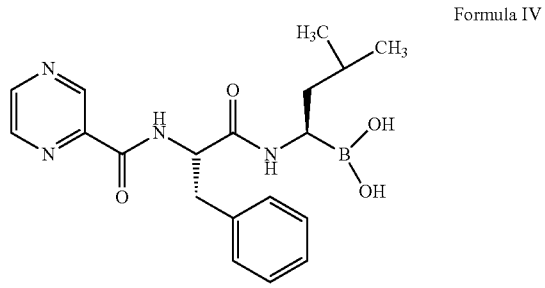

Formula IV comprising the steps of:

a) reacting a compound of formula A,

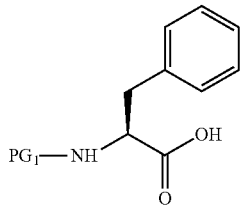

Formula A wherein PG₁ may be independently selected from tert-butyloxycarbonyl (Boc), phthaloyl, 9-fluorenylmethyloxy-carbonyl (Fmoc), triphenylmethyl (Trityl), carboxybenzyl (Cbz), trifluoroacetyl, benzyl (Bn), benzylidene, methanesulfonyl (Mesyl), toluene sulfonyl (Tosyl) or acyl;

with a compound of formula B or its salt,

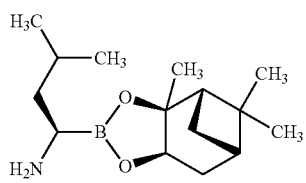

Formula B in the presence of a coupling agent and a base in a nitrile solvent to obtain a compound of formula I, Scheme-2

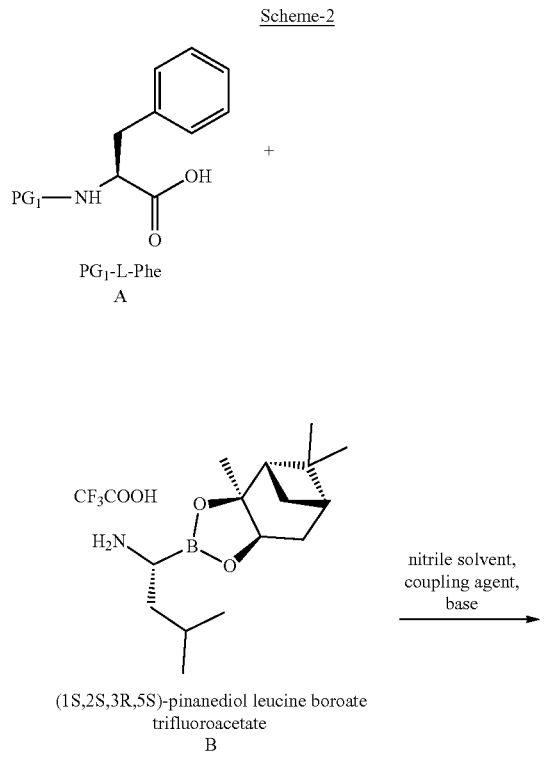

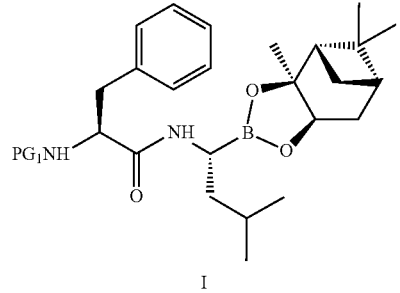

I b) isolating the compound of formula I, and converting to the compound of formula IV.

The coupling agent may be selected from the group comprising of O-(benzotriazol-1-yl)-N,N,N',N'-tetramethyluronium tetrafluoroborate (TBTU), dicyclohexylcarbodiimide (DCC), O-benzotriazole-N,N',N'-tetramethyl uronium hexafluoro phosphate (HBTU), benzotriazol-1-yloxypyrrolidinophosphonium hexafluorophosphate (PyBOP) and 1-ethyl-3-(3-dimethylaminopropyl) carbodiimide hydrochloride (EDC HCl), preferably O-(benzotriazol-1-yl)-N,N,N',N'-tetramethyluronium tetrafluoroborate (TBTU).

The base may be selected from the group comprising of triethylamine (Et₃N) and disopropylethyl amine (DIPEA), preferably disopropylethyl amine (DIPEA).

The nitrile solvent may be selected from the group comprising of acetonitrile, propionitrile or mixtures thereof. Most preferably, the reaction is carried out in acetonitrile.

In a preferred embodiment, the compound of formula A, wherein PG₁ is BOC, is reacted with the compound of formula B, more preferably the trifluoroacetic acid salt of formula B, in the presence of a suitable coupling agent such as TBTU and a suitable base such as DIPEA in a suitable solvent such as acetonitrile. Preferably, the reaction is carried out at −20 degree Celsius to 10 degree Celsius, more preferably at −10 to 5 degree Celsius. The reaction mixture is stirred for 2 hours at −5 to 5 degree Celsius. The compound of formula I can be isolated as a solid by adding water to the reaction mixture and it can be used without purification for the next step. Preferably, the obtained solid is re-crystallised in acetonitrile and water mixture.

The methods for the preparation of the compound of formula I reported in the prior art involve halogenated solvents and tedious and long work-up procedures including solvent exchange. Also, the prior art methods do not isolate the compound of formula I at this stage.

The inventors of the present invention found that the above mentioned process, which uses nitrile solvents in the reaction, makes isolation of the compound of formula I very easy, as the product can be precipitated simply by addition of water into the reaction mixture. This avoids tedious work up procedures including solvent exchange, filtration and/or quenching with an acidic solution etc.

The inventors also found that the isolation of the compound of formula I as a solid material at this stage is very advantageous as crystallization reduces the amount of impurities such as deboronated and dimer impurities.

The present invention has the advantages of providing the desired compound of formula I in a high yield and substantially free or free of deboronated and dimer impurities impurities. The reaction yield is ca. 93% (purity ~99.8%).

Thus, one aspect of the invention provides the compound of formula I, substantially free of deboronated and dimer impurities as determined by HPLC area %.

In a preferred embodiment, the invention provides the compound of formula I, free of deboronated and dimer impurities.

In an embodiment, the compound of formula I can be converted to the compound of formula IV by using methods known in the art.

In another embodiment, the compound of formula II is formed due to deprotection of the compound of formula I.

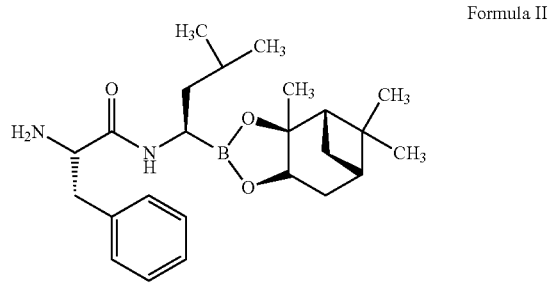

Formula II

The formation of corresponding salts depends on the use of corresponding acid used for cleaving the $PG_1$ of compound of formula I.

$PG_1$ is a suitable amine protecting group. Suitable amine function protection groups and protection and deprotection methods are well known in the art (see notably "Protective groups in organic synthesis", Greene T. W. and Wuts P. G. M., Wiley-Interscience, 1999). Preferably, the suitable amine protecting group $PG_1$ can be selected from tert-butyloxycarbonyl (Boc), Phthaloyl, 9-fluorenylmethyloxycarbonyl (Fmoc), triphenylmethyl (Trityl), carboxy benzyl (Cbz), trifluoroacetyl, benzyl (Bn), benzylidene, methanesulfonyl (Mesyl), toluene sulfonyl (Tosyl) or acyl.

The de-protection of the compound of formula I is carried out to obtain the corresponding compound of formula II or its salt by cleaving off the protecting group $PG_1$ using standard conditions for the deprotection of amines. Preferably, a suitable acid selected from the group comprising of mineral acids, such as hydrochloric acid, hydrobromic acid, phosphoric acid, metaphosphoric acid, nitric acid and sulphuric acid, and organic acids, such as tartaric acid, acetic acid, trifluoroacetic acid, citric acid, malic acid, lactic acid, fumaric acid, benzoic acid, glycolic acid, gluconic acid, succinic acid or alkylsulphonic acids such as methanesulphonic, ethanesulphonic acids, ethane-1,2-disulfonic acid and 2-hydroxyethanesulfonic acid and arylsulphonic acids such as benzene sulfonic acid, 2-naphthalenesulfonic acid, p-toluenesulphonic acid and naphthalene-1,5-disulfonic acid, most preferably p-toluenesulphonic acid is used in a suitable solvent such as tetrahydrofuran, ethyl acetate, dichloromethane and acetonitrile.

The deprotection may be carried out using from 1 to 10 equivalents of acid, more preferably from 1 to 3 equivalents at reduced or elevated temperatures, for example from −30° C. to 40° C., more preferably from 25° C. to 35° C., over a time period ranging from 1 minute to 10 hours, more preferably from 4 to 6 hours.

In a preferred embodiment, the para toluenesulphonic acid salt of formula (II) is prepared by treating a compound of formula I with para toluenesulphonic acid optionally in the presence of a suitable solvent such as dichloromethane.

The reaction mixture is stirred for 4 to 6 hours, at 20° C. to 30° C. The obtained solid is washed with an ether solvent; most preferably the solid is washed with di-isopropylether.

It was also found that the purity and yield of the product obtained at this stage is much improved when the compound of formula II is prepared by following the process of the present invention. The reaction yield is ca. 98% (purity ~99%).

At this stage, the yield of the compound obtained as per the process reported in WO 05/097809 is ca. 79%, while purity is not specified. Similarly, in WO 14/041324, the yield of the compound is ca. 66.45%. These methods of the prior art involve purging of HCl gas at low temperature which makes such processes cumbersome on a commercial scale.

The compound of formula II or its salt is further reacted with a compound of formula IIa to produce the compound of formula III, as depicted in below scheme-3:

Scheme-3

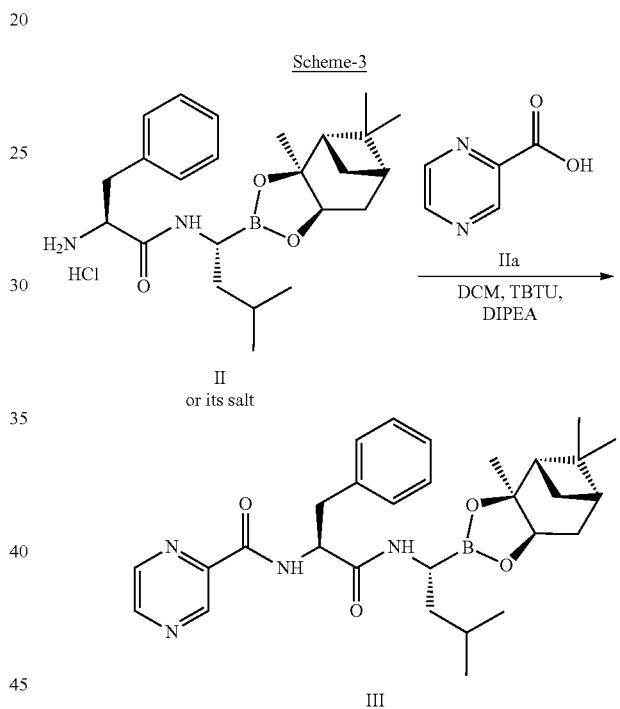

In an embodiment, the reaction is carried out in the presence of a coupling agent and a base in a solvent.

The coupling agent may be selected from the group comprising of O-(benzotriazol-1-yl)-N,N,N',N'-tetramethyluronium tetrafluoroborate (TBTU), dicyclohexylcarbodiimide (DCC), O-benzotriazole-N,N',N'-tetramethyl uronium hexafluoro phosphate (HBTU), benzotriazol-1-yloxypyrrolidinophosphonium hexafluorophosphate (PyBOP) and 1-ethyl-3-(3-dimethylaminopropyl) carbodiimide hydrochloride (EDC HCl), preferably TBTU.

The base may be selected from the group comprising of triethylamine (Et3N) and disopropylethyl amine (DIPEA), preferably disopropylethyl amine (DIPEA).

The solvent may be selected from the group comprising of acetonitrile, propionitrile or mixtures thereof. Most preferably, the reaction is carried out in acetonitrile.

In another embodiment, the compound of formula II, preferably the para toluenesulphonic acid addition salt of formula II, is reacted with the compound of formula IIa in the presence of a suitable coupling agent such as TBTU and a suitable base such as DIPEA in a suitable monophasic solvent system such as acetonitrile. Preferably, the reaction is carried out at −10 to 10 degree Celsius, more preferably at 0 to 10 degree Celsius. The reaction mixture is stirred for 2 to 3 hours at 0 to 10 degree Celsius. In a preferred embodiment mixture is advanced to the next stage without isolation of the compound of formula III.

The compound of formula IV is obtained by de-protection of the boronic acid moiety of formula III.

In an embodiment, the de-protection of the boronic acid moiety is carried out in a monophasic solvent.

In a preferred embodiment, the de-protection of the boronic acid moiety is carried out in acyclic ether selected from diethyl ether, di-isopropyl ether, methyl-t-butyl ether. Most preferably, the reaction is carried out in di-isopropyl ether.

The de-protection of the boronic acid moiety in the prior art methods is carried out in a biphasic solvent system comprising alcohols such as methanol, ethanol, n-propanol, isopropanol, n-butanol and isobutanol and lower hydrocarbons such as heptanes, hexane etc. Such prior art methods involve a long and tedious work-up procedure which require multiple washings with heptane followed by distillation of methanolic solution. Subsequently long acid base purification steps are required, which lead to a significant loss of yield.

The inventors of the present invention found that the method of WO 05/097809 at this stage results in a compound containing a tripeptide impurity of 0.29 area % (at RRT 1.89) as measured by high performance liquid chromatography (HPLC). The impurity is represented by the structure as shown below:

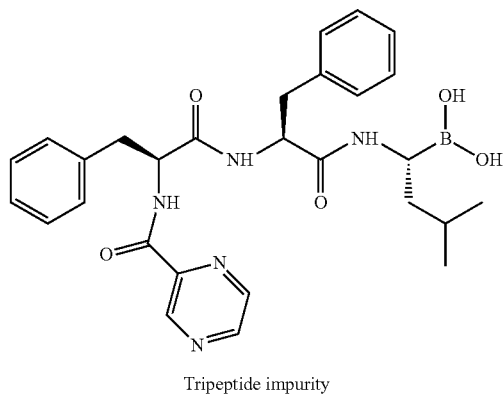 [SMILES: CC(C)C[C@H](NC(=O)[C@H](Cc1ccccc1)NC(=O)[C@H](Cc1ccccc1)NC(=O)c1cnccn1)B(O)O]

Tripeptide impurity

The present invention has the advantages of providing the desired compound of formula IV in high yield with significantly lower levels of impurities or free of impurities (e.g. tripeptide impurity) as compared to the state of the art.

In CN 2012/1539954, the de-protection of the boronic acid moiety is carried out in a single solvent such as tetrahydrofuran. However, this process results in a sticky solid with a very low yield.

The monophasic solvent system of the present invention comprising acyclic ether solvent avoids the formation of impurities. The impurity at RRT 1.89 is not detected, unlike in the processes of the prior art. This avoids the tedious work-up procedures and purification steps of the prior art.

In one aspect the process of the present invention provides bortezomib i.e.

[(1R)-3-methyl-1[[(2S)-1-oxo-3-phenyl-2-[(pyrazinyl-carbonyl)amino]propyl]amino]butyl] boronic acid is 98% or greater, 98.5% or greater, 99.0% or greater, 99.5% or greater, 99.7% or greater, 99.9% or greater, or 99.95% chiral purity (% de), as measured by HPLC (Chiralpak AD-H (250×4.6) mm, 5 μm; wavelength 270 nm at flow rate 0.6 mL/min; eluents: n-Hexane (92%), Ethanol (5%), 2-Propanol (3%), Formic acid (1 mL).

Another aspect of the invention is to provide a process for the preparation of a crystalline form of the compound of formula IV, having characteristic X-ray powder diffraction peaks at 6.11, 12.18, 17.25, 18.98, 19.22, 24.55, 24.39±0.2 degrees 2:

In an embodiment, the compound of formula IV is dissolved in aliphatic ester to obtain a clear solution. To this solution, acyclic ether is added and a crystalline form of formula IV is isolated.

The aliphatic ester is selected from the group of methyl acetate, ethyl acetate, preferably ethyl acetate.

The acyclic ether is selected from diethyl ether, di-isopropyl ether, methyl-t-butyl ether, preferably di-isopropyl ether.

In a preferred embodiment, the compound of formula IV is dissolved in an aliphatic ester such as ethyl acetate at a temperature of 20 to 50 degree Celsius. To the solution, acyclic ether such as di-isopropyl ether is added and the reaction mass is cooled to −10 to 10 degree Celsius, preferably 0 to 5 degree Celsius. The solid material is filtered and dried under vacuum to obtain the crystalline form of formula IV.

In an embodiment, the crystalline form of formula IV of the present invention is characterized by its X-ray powder diffractogram as depicted in the figure.

EXPERIMENTAL

Detailed experimental parameters according to the present invention are provided by the following examples, which are intended to be illustrative and not limiting of all possible embodiments of the invention.

Examples

To demonstrate the benefits of the present specification, examples of the prior art were carried out and indicated as reference example(s).

The X-ray Powder Diffraction (XRPD): XRPD analysis was conducted on a Panalytical, Model-Empyrean X-Ray powder diffractometer. The instrumental parameters are mentioned below:

Start position [2 Theta]: 3.0
End position [2 Theta]: 40.0
Step size [2 Theta]: 0.013
Scan step time (s): 39.27
Anode material: Cu
Generator setting: 40 mA, 45 KV
Spinning: Yes
Goniometer: theta: theta
Sample stage: Reflection-transmission spinner
Sample mode: Reflection
Sample specimen preparation: Sample back loading technique The chiral purity was measured by HPLC using a (Chiralpak AD-H column with parameters as below:
Column: Chiralpak AD-H (250×4.6) mm, 5 μm
Flow Rate: 0.6 mL/min.

Column Oven Temperature: 35° C.
Auto sampler Temperature: 8° C.
Detector Wavelength: 270 nm
Injection Volume: 10 μL
Run Time: 50 minutes
Eluents (Mobile phase): n-Hexane (92%), Ethanol (5%), 2-Propanol (3%), Formic acid (1 mL)

Example-1

Preparation of (1S,2S,3R,5S)-Pinanediol N—BOC-L-phenylalanine-L-leucine boronate (Formula I)

Boc-L-phenylalanine (100 g) was added into a mixture of acetonitrile (1000 mL), di-isopropylethyl amine (146.1 g) and TBTU (145.2 g) at a temperature range of −10 to 5 degree Celsius. The trifluoroacetic acid salt of pinanediol-leu-boronate (143 g) was added, and the reaction mixture was stirred for 2 hours at a temperature range of −5 to 5 degree Celsius.

To the reaction mixture, distilled water (1500 mL) was added at 10 to 30 degree Celsius and stirred for 1-2 hours at 20 to 30 degree Celsius. The obtained solid was filtered, washed with distilled water (2×400 mL) and dried under vacuum. The solid was re-crystallised from acetonitrile and water mixture.

Yield: 93.3% (180 g)
HPLC Purity: ~99.8%

Example-2

Preparation of p-toluenesulfonic acid salt of (1S,2S,3R,5S)-Pinanediol L-phenylalanine-L-leucine boronate (Formula II)

To a solution of the compound of formula I (100 g) in dichloromethane (1000 mL), p-toluenesulfonic acid monohydrate (93.0 g) was added and the reaction mixture was stirred at 25-35 degree Celsius for 4-6 hrs. Distilled water (1000 mL) was added to the reaction mixture and further stirred at 20-30 degree Celsius for 10-20 minutes. The reaction mixture was allowed to settle for 10-20 min and the layers were separated. To the organic layer di-isopropylether (3000 mL) was added at 20-30 degree Celsius under stirring at 20-30 degree Celsius for 4-6 hrs. The solid was filtered and washed with di-isopropylether.

Yield: 96.5% (100 g)
HPLC Purity: ~99.9%

Example-3

Preparation of [(1R)-3-methyl-1[[(2S)-1-oxo-3-phenyl-2-[(pyrazinyl carbonyl) amino]propyl]amino] butyl] boronic acid (Bortezomib) (Formula IV)

To a stirred solution of pyrazine-2-carboxylic acid (23.4 g) in acetonitrile (1000 ml), TBTU (60.45 g), the compound of formula II (100 g) and DIPEA (64 g) was added at 0 to 10 degree Celsius and the reaction mixture was stirred for 2-3 hours. 500 ml of di-isopropyl ether were added and the temperature was raised to room temperature. 2000 ml of water were added and stirred for 30 minutes and the layers were separated.

The compound of formula III ((1S,2S,3R,5S)-Pinanediol N-(2-pyrazinecarbonyl)-L-phenylalanine-L-leucine boronate) was extracted from the aqueous layer by using 2×500 ml of di-isopropyl ether. To this di-isopropyl ether solution, 26.2 g of isobutylboronic acid and 100 ml of conc. HCl were added and the reaction mixture was stirred for 2-4 hours at room temperature. NaOH solution was added and the pH was adjusted to 10 to 12. The reaction mixture was stirred for 20-30 minutes and the layers were separated. 500 ml of ethyl acetate was added to the aqueous layer and the pH of the solution was adjusted to 5 to 5.5 by using a solution of HCl. Organic layer was separated and di-isopropyl ether (1500 ml) was added and the reaction mixture was stirred at 0 to 5 degree Celsius for 12 to 15 hours. The solid obtained was filtered and washed with di-isopropyl ether (2×100 ml) and dried to obtain the title compound.

Yield: 77.0% (50 g)
HPLC Purity: ~99.9%

Example-4

Crystallisation of the Compound of Formula IV (Bortezomib)

The compound of formula IV (100 g) was dissolved in ethyl acetate (1900 ml) to obtain a clear solution. To this solution, di-isopropyl ether (2000 ml) was added to the reaction mixture. The reaction mixture was stirred at 0 to 5 degree Celsius for 12 to 15 hours. The solid obtained was filtered and washed with di-isopropyl ether (2×200 ml) and dried to give a crystalline form of formula IV.

Yield: 99.95% (99.95 g)
HPLC Purity: ~99.9%
Chiral Purity (% de): 100.0% as measured by HPLC (Chiralpak AD-H (250×4.6) mm, 5 μm; wavelength 270 nm at flow rate 0.6 mL/min; eluents: n-hexane (92%), ethanol (5%), 2-propanol (3%), formic acid (1.0 mL)

X-ray diffraction peaks at an angle of refraction 2: 6.11, 12.18, 17.25, 18.98, 19.22, 24.55, 24.39±0.2 degrees 2:

Reference Example:

Experimental procedure followed for the preparation of [(1R)-3-methyl-1[[(2S)-1-oxo -3-phenyl-2-[(pyrazinyl carbonyl) amino]propyl]amino]butyl] boronic acid (Formula IV) as given in CN 2012/ 1539954 (de-protection of Formula III):

Hydrochloric acid was added to the solution of the compound of formula III (2.0 g) in Tetrahydrofuran (18.75 ml) at 0-5° C. Isobutyl boronic acid (0.65 g) was added in portions. Slowly raised the temperature and stirred for 9 hrs at 20-30 degree Celsius. The reaction mass was concentrated under vacuum then n-Heptane (4 mL) was added to the residue and stirred for 30 min. at 20-30 degree Celsius. Solid was filtered and washed with n-Heptane. A sticky solid of formula IV obtained. (Purity 92.13%).

We claim:

1. A process for preparing a compound of Formula IV,

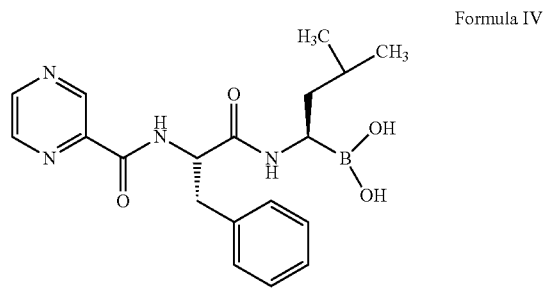

Formula IV the process comprising:
 a) reacting a compound of Formula A,

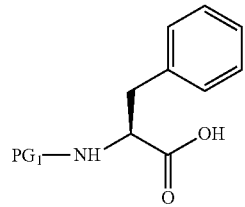

Formula A wherein PG$_1$ is tert-butyloxycarbonyl (Boc), pthaloyl, 9-fluorenylmethyloxycarbonyl (Fmoc), triphenylmethyl (Trityl), carboxybenzyl (Cbz), trifluoroacetyl (CF3CO), benzyl (Bn), benzylidene, methanesulfonyl (Mesyl), tosyl (Ts), or acyl;
with a compound of Formula B or its salt,

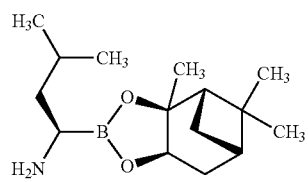

Formula B in the presence of a coupling agent and a base in a nitrile solvent to obtain a reaction mixture comprising a compound of Formula I,

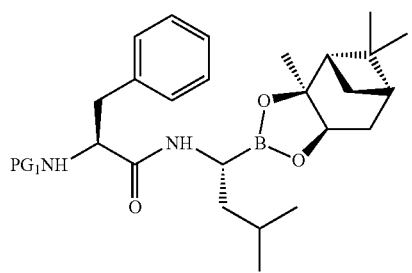

Formula I b) adding water to the reaction mixture to precipitate the compound of Formula I as a solid, isolating the compound of Formula I as a solid which is substantially free of dimer impurities, and converting the compound of Formula I to the compound of Formula IV.

2. A process for preparing a compound of Formula I

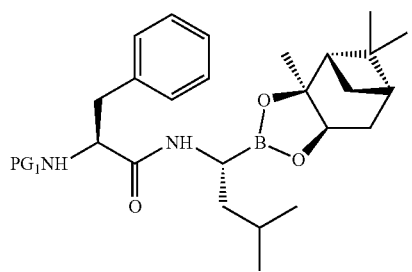

Formula I the process comprising:
 a) reacting a compound of Formula A,

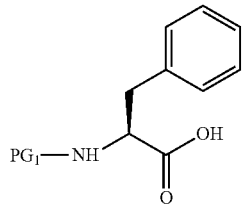

Formula A wherein PG$_1$ is tert-butyloxycarbonyl (Boc), phthaloyl, 9-fluorenylmethyloxycarbonyl (Fmoc), triphenylmethyl (Trityl), carboxybenzyl (Cbz), trifluoroacetyl, benzyl (Bn), benzylidene, methanesulfonyl (Mesyl), toluene sulfonyl (Tosyl), or acyl;
with a compound of Formula B or its salt,

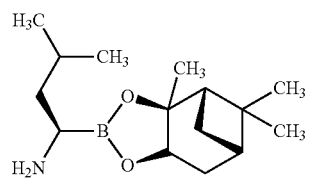

Formula B in the presence of a coupling agent and a base in a nitrile solvent, to produce a reaction mixture comprising a compound of Formula I, adding water to the reaction mixture to precipitate the compound of Formula I as a solid, and isolating the compound of Formula I as a solid which is substantially free of dimer impurities.

3. The process of claim 1, wherein converting the compound of Formula I to the compound of Formula IV comprises:
 i) deprotecting the compound of Formula I to obtain a compound of Formula II or its salt,

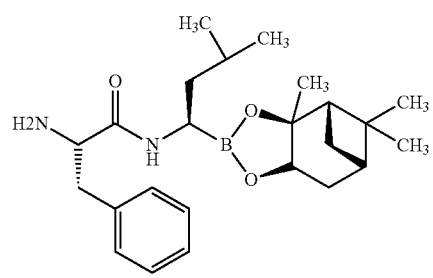

Formula II ii) reacting the compound of Formula II or its salt with a compound of Formula IIa,

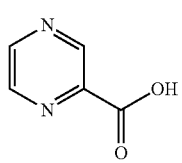

Formula IIa in the presence of a coupling agent and a base, to obtain a compound of Formula III, Formula III

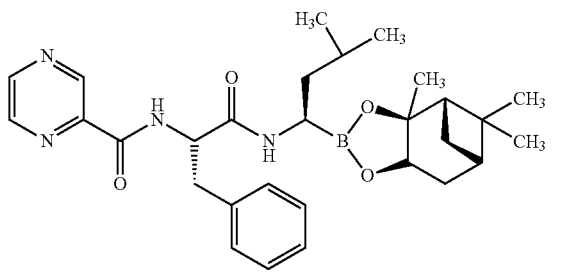

and iii) deprotecting the boronic acid moiety to obtain the compound of Formula IV.

4. The process according to claim 3, wherein reacting the compound of Formula II or its salt with a compound of Formula IIa is carried out in the presence of a nitrile solvent.

5. The process according to claim 1, wherein the nitrile solvent comprises acetonitrile or propionitrile.

6. The process according to claim 3, wherein deprotecting the boronic acid moiety is carried out in a monophasic solvent system comprising diethyl ether, di-isopropyl ether, or methyl-t-butyl ether.

7. The process according to claim 1, wherein the coupling agent comprises dicyclohexylcarbodiimide, 1-(3-dimethylaminopropyl)-3-ethylcarbodiimide, benzotriazol-1-yloxytris (dimethylamino)phosphonium hexafluorophosphate, or O-(1H-benzotriazol-1-yl)-N,N,N',N'-tetramethyluronium tetrafluoroborate.

8. The process according to claim 1, wherein the base comprises N,N-diisopropyl ethyl amine or triethyl amine.

9. The process according to claim 3, wherein deprotecting the boronic acid moiety is carried out in the presence of a boronic acid acceptor.

10. The process according to claim 1, wherein the compound of Formula I is free of deboronated impurities.

11. The process according to claim 1, wherein the compound of Formula I is substantially free of deboronated impurities.

12. The process according to claim 1, wherein the chiral purity of the compound of Formula IV is greater than 99.95% as measured by HPLC.

13. The process according to claim 3, wherein deprotecting the compound of Formula I comprises reacting the compound of Formula I with p-toluenesulfonic acid to produce the compound of Formula II or its salt.

14. The process according to claim 13, comprising deprotecting the compound of Formula I in the presence of a halogenated solvent to produce a reaction mixture comprising the compound of Formula II or its salt and the halogenated solvent, extracting the reaction mixture with water to produce a solution comprising the compound of Formula II or its salt and the halogenated solvent, adding an ether solvent to the solution to precipitate the compound of Formula II as a p-toluenesulfonic acid salt, and isolating the precipitate as a solid.

15. The process according to claim 14, wherein the halogenated solvent comprises dichloromethane.

16. The process according to claim 14, wherein the ether solvent comprises diisopropyl ether.

17. The process according to claim 3, wherein the compound of Formula IV is substantially free of tripeptide impurities.

18. The process according to claim 12, wherein the compound of Formula IV is substantially free of tripeptide impurities.

* * * * *